United States Patent [19]

Paisley et al.

[11] Patent Number: 4,522,856

[45] Date of Patent: Jun. 11, 1985

[54] SYNTHETIC ARTICLES HAVING A CORK-LIKE APPEARANCE

[75] Inventors: Gary V. Paisley, Lilburn; Alex Malaspina, Atlanta, both of Ga.

[73] Assignee: The Coca-Cola Company, Atlanta, Ga.

[21] Appl. No.: 458,775

[22] Filed: Jan. 18, 1983

Related U.S. Application Data

[62] Division of Ser. No. 389,509, Jun. 16, 1982.

[51] Int. Cl.³ .................... B65D 53/00; B32B 3/02; B32B 5/14; B32B 5/20
[52] U.S. Cl. .................................. 428/64; 215/348; 215/349; 428/314.4; 428/318.8
[58] Field of Search ............... 215/348, 349, DIG. 2, 215/DIG. 4; 428/314.4, 314.8, 318.6, 318.8, 64, 455

[56] References Cited

U.S. PATENT DOCUMENTS

| 3,645,930 | 2/1972 | Normanton | 521/134 |
| 3,645,931 | 2/1972 | Normanton | 521/143 |
| 4,091,136 | 5/1978 | O'Brien et al. | 215/349 |
| 4,255,372 | 3/1981 | Kuhnel et al. | 521/140 |
| 4,273,880 | 6/1981 | Pump et al. | 521/143 |
| 4,363,849 | 12/1982 | Paisley et al. | 428/318.8 |

Primary Examiner—William J. Van Balen
Attorney, Agent, or Firm—Birch, Stewart, Kolasch & Birch

[57] ABSTRACT

A composition for forming a molded article having the external appearance resembling that of natural cork which comprises, a thermoplastic resinous material as the major ingredient thereof, a caramel colorant which is present in an amount sufficient to impart to the thermoplastic resinous material the color of natural cork, and a blowing agent, said thermoplastic resinous material being compatible with the caramel colorant and having a processing temperature which is not so high as to degrade the caramel colorant during the molding operation.

3 Claims, 9 Drawing Figures

SYNTHETIC ARTICLES HAVING A CORK-LIKE APPEARANCE

This application is a divisional of copending application Ser. No. 389,509 filed on June 16, 1982.

BACKGROUND OF THE INVENTION

1. Field of the Invention

The present invention relates to molded articles having the appearance of natural cork, such as closures for liquid product containers, and to methods and apparatus for making the same. More specifically, the present invention relates to the use of a particular colorant in the molding of synthetic plastic closures which gives the closures the appearance of natural cork.

2. Description of Prior Art

It is known heretofore to manufacture articles from foamed thermoplastic materials by injection or extrusion of polyurethane, polystyrene or polyolefins. In these cases, the thermoplastic material may be expanded from a granular form to assume a porous, solidified foam-like structure by the action of various propellants or agents for expanding or blowing the materials. The blowing agents, in accordance with normal practice, are usually gases or gas generating substances that have been dissolved or otherwise intimately incorporated within the thermoplastic resinous material while it is in an unexpanded granular form. The application of heat to such a mixture causes the blowing agent to be released or thermally expanded or both, while the thermoplastic material is attaining a foaming temperature at which it is sufficiently softened and yieldable to permit the pressure of the expanding blowing agent to expand it into the desired foam structure.

In a special case of extrusion forming of foamed thermoplastic materials, it is also known to decorate the surface of articles so produced to resemble natural wood by imparting to the surface a parallel grain structure. Such decoration is accomplished by extruding the material through a die having, in particular, a multiple number of apertures to form a corresponding number of strands of expanding resin, collecting these strands in parallel relationship, and then coalescing them into a body of any desired length. Contacting surfaces of the strands create parallel grain lines which remain clearly visible in the surface of the finished articles and resemble natural wood grain.

In a special case of injection molding of foam thermoplastic materials, it is known to mold articles by injecting into an enclosed cavity a measured amount of expandable thermoplastic resin so that the cavity is not completely filled by the unexpanded material but becomes filled as the material expands. As expansion occurs, the softened resin is forced by a gaseous blowing agent into contact with the relatively cool walls of the mold cavity where the portion of the resin in direct contact with the walls is solidified and forms a dense outer layer or skin conforming to the shape of the cavity and functioning as a barrier, thereby preventing the escape of the gaseous blowing agent from the article and causing gas bubbles to be entrapped in the article's interior region. Thus, articles molded in this manner are characterized by a porous, foam-like interior and a dense outer shell or skin having the same general size and shape as the mold cavity and which are essentially impermeable to most substances.

By employing certain highly flexible thermoplastic materials, for example polyolefin copolymers, such as ethylene vinyl acetate, in the previously described injection molding process, the resulting foamed articles will exhibit elastic properties closely resembling similar products manufactured from other natural and synthetic elastomers. This flexibility and resiliency plus the presence of an essentially impermeable skin allows these same articles, if molded in the proper size and shape, to function as closures for liquid product containers by being compressed and fitted into the container opening, then being allowed to expand, filling the opening and creating a continuous seal about its perimeter. Therefore, such articles would theoretically be useful as replacements for similar closure devices manufactured of more familiar materials, such as natural cork used in containers of medicine, wine and spirits.

In reality, efforts at replacing natural cork closures in liquid product containers, especially containers for wine products, by manufacturing and utilizing closures from injection molded foamed thermoplastics have not been very successful. This has been due primarily, it is believed, to the lack of asethetically created consumer appeal for such closures, and the relationship of the dense outer skin to the porous inner core which dense outer skin, while necessary to make the closure essentially impermeable, can be a detriment to the sealing function of these articles, particularly when leakage channels are formed on the dense outer skin during the sealing of these articles.

Since such prior art closures must be compressed to be fitted into liquid product containers there is a tendency for the dense outer layer of the closures to wrinkle and form longitudinal channels in the outer surface of the foamed articles. Such channels could form leakage paths for the container contents or allow the ingress of substances harmful to the product being contained, such as ambient air in the case of the medicine or food products. Tests have shown that these channels are caused primarily by the presence of relatively large void spaces between the dense outer skins and the porous inner core of the foamed articles, their presence being the result of a previously unrecognized phenomena occurring during the molding of the articles. Since the dense outer skin has a much higher resistance to compression than the porous inner core, it tends to deflect into any available void space, creating a channel on the outer surface of the closure that could result in a disruption of the otherwise continuous perimeter seal.

In addition to the foregoing problems, prior art molded closures have not been uniform and consistent in design, color and performance. Thus, such prior art closures have not been found readily acceptable as a replacement for similar closure devices, such as natural cork used in containers of medicine, wine and spirits.

In U.S. Pat. No. 4,363,849 a new and improved method and resulting product were developed for making a closure made of thermoplastic resinous material having a natural, cork-like appearance, which substantially eliminated the prior art problems discussed hereinabove. According to the invention disclosed in this application a thermoplastic resin is injected into one or more mold cavities through a single orifice in each mold cavity which forms the material into a single and continuous elongated strand within each mold cavity. As the strand length builds in each mold cavity, it is contained by the cavity walls which force the single and continuous elongated strand to collect in a random fashion when the strand meets resistance within the mold cavity and contacts itself at various points along its length. The expansion of the blowing agent causes the randomly positioned loops of the strand to expand and coalesce leaving grain lines in the surface of the molded article similar to those found in the surface of extruded articles manufactured in accordance with previously known teachings but which, in distinction, are not straight or parallel but of varying direction, occasionally intersecting, and which are formed from a single and continuous elongated strand of resin. Also, these articles contain the randomly oriented grain lines on the entire outer surface, including the ends thereof, and thus constitutes an improvement over articles manufactured by extrusion that normally do not contain randomly oriented grain lines on the ends of the articles. These randomly oriented grain lines, when embodied in the entire surface of an article having the same general size and shape as the natural cork portion of a closure for a liquid product container, cause the article to resemble natural cork in appearance. Such an effect is achieved by avoiding an abrupt expansion of the thermoplastic material as it is injected into the mold cavity. Thus, by retarding the expansion of the thermoplastic material sufficiently to allow completion of the injection of said thermoplastic material into the mold cavity, the integrity of the strand configuration is maintained, which, in turn, is reflected in the formation of grain lines on the surface of the closure which is thus produced. The retarding of the expansion of the thermoplastic material is achieved through temporary pressurization of the mold cavity which is achieved by rapidly injecting at high pressure, an expandable thermoplastic resinous material into said mold cavity and gradually removing a portion of the air displaced by said injected thermoplastic resinous material through controlled minimum venting of the mold cavity and expanding the coiled resinous material in a controlled manner through a continuation of the minimum venting to fill the mold cavity.

Resistance to wrinkling during subsequent compression of the article is improved to a satisfactory level by incorporating into the molding method a specific technique and series of embodiments to the molding equipment which, together, eliminate the tendency of the foaming material to form large void spaces between the dense outer skin and the foamed interior of the article. This is accomplished by insuring that all the resin material to be utilized in each article enters the mold cavity, and that each cavity entrance is positively sealed prior to the expansion of the resin, to form a solidified outer skin adjacent to the cavity wall.

It was found in prior molding techniques that further ingress of material after the relatively rigid and dense outer skin was formed, sets up a shear boundary layer within the material being molded and results in the still soft inner core of the article shifting relative to the dense outer skin, thus breaking the material bond between the dense outer skin and the inner core. Gas pressure subsequently forces the porous inner core of the article away from the dense outer skin thereby creating large void spaces immediately beneath the rigid and dense outer skin. The lack of a complete bond between the dense outer skin and the porous inner core results in, during compression of the molded article, relative movement between the two components (i.e. dense outer skin and porous inner core) of the molded closure device, which results in wrinkles and leakage paths on the outer surface of the molded closure device.

Chronological separation of injection and expansion steps is achieved by several embodiments to the improved molding technique and equipment, including:

1. The maximization of the available injection pressure and speed with a corresponding minimization of venting within each mold cavity of a plurality of mold cavities with the result, during injection, of a temporary pressurization of each cavity caused by rapid ingress of expandable resin and the opposing slow escape of displaced gas which restricts the expansion of the thermoplastic resin to form a solidified exterior until the injection of each cavity is completed.

2. The creation of a runnerless molding technique by the incorporation within the single small orifice of each mold cavity through which all material must flow to reach each mold cavity of a positive means of shutting off the flow of material to or from each cavity such that no continued channel for resin flow exists between each shutoff in its associated cavity and the heated runner channel following completion of the injection portion of the molding cycle of that particular cavity.

3. The utilization of each shutoff in its associated cavity as a means of initiating and terminating the injection of material into each cavity such that the period for transfer of material to or from each mold cavity through its respective injection orifice can be positively controlled.

Thus the method for making a closure made of a thermoplastic resinous material and having a natural cork-like appearance as defined by application Ser. No. 202,156 can be summarized by the steps of providing a mold cavity having the shape of a desired closure with predetermined internal dimensions, rapidly injecting, at high pressure an expandable thermoplastic resinous material in an amount less than that required to fill the mold cavity and in the form of a strand, into the mold cavity, the strand collecting in said cavity as randomly-oriented coils, the pressure produced in the mold cavity by the injection temporarily pressurizing the cavity, thereby retarding the expansion of the thermoplastic resinous material sufficiently to allow completion of the injection of the thermoplastic resinous material, while maintaining the integrity of the strand configuration, simultaneously with the temporary pressurization, gradually removing a portion of the air displaced by the injected thermoplastic resinous material through controlled minimum venting of the mold cavity, thereby expanding the coiled resinous material in a controlled manner through a continuation of said minimum venting to fill the mold cavity, the walls of the mold cavity being maintained at a temperature sufficiently cool to cause the resinous material to solidify into a rigid, outer skin when it contacts the walls, whereby the coalesence of the coils during expansion creates randomly-oriented grain lines in the surface of the closure which resembles the appearance of natural cork.

Advantageously, the entrance orifice is immediately sealed after the thermoplastic resinous material has been injected into the cavity to stop any further flow of the resinous material, with the cavity and also the entrance orifice being kept in a sealed condition until the resinous material subsequently expands and solidifies to form the closure. The closure thus formed has a liquid impervious outer skin and a foamed inner core with no appreciable void spaces or separations between the outer skin and the foamed inner core into which said outer skin could collapse when compressed.

In U.S. Pat. No. 4,363,849 a blend of pigments (colorants) were utilized to impart a cork-like appearance to the products. For example, in one embodiment at least 5 percent of the pigment utilized is noted as being a blend of FD&C certified alumina lake powders having a particle size of 40 to 60 microns. In another embodiment the total pigment blend was said to comprise approximately 0.5 percent by weight of the raw material formulation used in the process. However, it has been found that such colorants do not possess universal governmental acceptability and are also a relatively expensive portion of the final product.

Accordingly an object of the present invention is to provide a molded article having a cork-like appearance.

A further object of the present invention is to provide a synthetic cork closure product having an improved cork-like appearance.

Another object of the present invention is to provide a new and improved colorant for a synthetic cork closure product which imparts a color to the closure which very closely resembles the color of natural cork closures.

A further object of the present invention is to provide a new and improved colorant for a synthetic cork closure product which is particularly compatible in the injection molding method for making closures as described hereinbelow.

Still another object of the present invention is to provide a new and improved colorant for a synthetic clork closure product which possesses universal governmental acceptability.

A still further object of the present invention is to provide a new and improved colorant for a synthetic cork closure product which is relatively inexpensive when compared to other colorants normally used in plastic materials.

Yet another object of the present invention is to provide an injection molding method for making a closure made of a resinous material containing a new and improved colorant which gives the closure a cork-like appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, plastic articles having a cork-like appearance, particularly synthetic cork closure products having a natural cork-like appearance can be obtained by incorporating into the thermoplastic material used to make the synthetic cork closure an effective amount of caramel as the colorant therefor. The use of either liquid or powdered caramel in the synthetic cork closure is effective in imparting a color which very closely resembles the color of natural cork closures. Because caramel colorant is already used in various alcoholic beverages and because it is readily recognized as a commonly used food additive, its presence as a colorant in a synthetic cork possesses universal governmental acceptability as a truly international product. Also, compared to other FDA-approved colorants normally used in plastic materials, caramel is relatively inexpensive, representing approximately 4 percent of the cost of presently known and used FD&C colorants.

BRIEF DESCRIPTION OF THE DRAWINGS

The objects of the present invention and the attendant advantages thereof will become more readily apparent by reference to the following drawings wherein like reference characters are employed to designate like parts.

DETAILED DESCRIPTION OF THE INVENTION

To provide a synthetic cork closure which can function satisfactorily as a replacement for the natural cork portion of closures for containers of medicine and food products such as wine and spirits, it has been found desirable to control the size, shape, surface smoothness, elasticity, density distribution and aesthetic appearance of such articles. Factors found to be of particular importance in achieving the desired results in these areas include, for example, the use of particular kinds of thermoplastic resins and blends thereof, blowing agents, processing temperatures, injection pressures and injection speed, mold design, and mold temperatures, and the like.

The basic resinous materials or blends thereof which can be utilized to make articles which are molded or otherwise formed into articles of manufacture according to the present invention include those thermoplastic resins which possess good flexibility and resiliency and which are sufficiently compatible with the caramel colorant to produce a cork-like color and whose processing temperature is not so high as to rapidly degrade the caramel colorant. Advantageously, resinous materials with processing temperatures of less than 400° are desirable. Depending on the process, this could include products made from such polymers as vinyl polymers, for example, polyolefins such as polyethylene, polypropylene, etc., polystyrene, polytetrafluoroethylene, polyvinyl chloride, polyvinylidene chloride, polymethyl acrylate, polymethyl methacrylate, polyvinylacetate, etc.; copolymers such as ethylene-vinyl acetate, vinyl chloride-vinyl acetate; vinyl chloride-vinyl acetate-maleic anhydride, vinylidene chloride-vinyl chloride, vinylidene chlorideacrylonitride; synthetic elastomers such as styrenebutadiene copolymers, acrylonitrile-butadiene copolymers, acylonitrile-butadiene-styrene terpolymers, isopreneisobutylene copolymers, polychloroprene, chloropreneisoprene copolymers, etc.; condensation polymers, for example melamine-formaldehyde, melamine-butanolformaldehyde, phenol-formaldehyde, p-substituted phenol-formaldehyde, urea-formaldehyde, TS polyesters, e.g., ethylene glycol-terephthalic acid, alkyl resins, polyacetals, e.g., polyacrolein diethyl acetal, cellulosic polymers; i.e., a glucose polymer of high molecular weight, such as nitrocellulose, polyurethanes, e.g., polyethyl-N-phenyl-carbonnate and the like.

The preferred resinous materials which can be utilized to make closure products, such as synthetic cork closures according to the present invention include polyolefins or copolymers or blends thereof which are non-toxic and which possesses good flexibility and resiliency, such as for example polyethylene, polypropylene, ethylenevinyl acetate copolymer (EVA) and the like. To achieve the combination of properties desired in the finished articles, an EVA copolymer having a vinyl acetate content of about 9 to 25% by weight and a melt index of about 2 to 8 has been found to be particularly effective.

The properties of the finished closures may be enhanced by the addition to the basic resin of small quantities of a hardness modifying additive, such as polyethylene or ionically cross-linked ethylene-methacrylic acid copolymers. The addition of such hardness modifying additives, such as polyethylene or ionically cross-linked ethylene-methacrylic acid copolymers, tends to vary the hardness and strength of the finished article and can be added to the molding composition in an amount up to about 20% by weight advantageously 5 to 19% by weight, based on the total weight of the composition.

The total amount of resinous material, that is, the basic resinous materials including the hardness modifying additive, if any, comprise up to about 99.5% by weight of the molding composition, advantageously about 99 to 99.5% by weight.

The caramel colorants which can be used in the molded articles of the present invention, particularly the synthetic closures of the present invention include those in either liquid or powdered form which are added to the resinous material in an amount sufficient to impart a color to the synthetic closures which very closely resembles the color of natural cork closures. Whether liquid caramel or powdered caramel is utilized depends largely upon the particular molding method. When using the injection molding method as defined in the present application, caramel in the liquid form, that is containing a high water content of say up to about 72% by weight is not desirable because of its tacky consistency which causes it to attach itself to the internal elements of the injection molding equipment where it tends to crystallize and burn. Powdered caramel, on the other hand, possesses a much smaller amount of water of say about 28% by weight and thus is particularly effective in the injection molding method utilized in the present application. Obviously, when using molding methods were a tacky consistency is acceptable, then the use of liquid caramel is acceptable.

The powdered caramel colorant which can be utilized in the present invention is of the type described in Title 21, §73.85 of the U.S. Code of Federal Regulations. The use of this particular colorant is very effective in imparting a color to the synthetic closures which very closely replicates the color of natural cork closures. Because this caramel colorant is already used in various alcoholic beverages and is readily recognized as a commonly used food additive, it already possesses universal governmental acceptability at both national and international levels.

The more specific types of caramel which can be utilized in the present invention are the commercially available powdered caramels as designated by the International Caramel Institute. These caramel colorants have been designated into four classes as follows:

| | |
|---|---|
| Class I | Caramel Color (Plain) |
| Class II | Caramel Color (Caustic Sulfate) |
| Class III | Caramel Color (Ammonia Process) |
| Class IV | Caramel Color (Sulfite Ammonia Process) |

All caramel colorants can be identified as to their class based solely on their total nitrogen and total sulfur contents. The type of caramel to be utilized in a preferred embodiment of the present invention is the powdered caramel falling into Class I (Caramel Color (plain)), having a spectrograph color intensity of approximately $31 \times 10^3$ (CP-1) and a total nitrogen content of <0.1% by weight and a total sulfur content of <0.1% by weight. Caramel Color (plain) which is also known as spirit caramel is a class of caramel color prepared by the controlled heat treatment of carbohydrates with caustic or acid. The carbohydrate raw materials are commercially available food-grade nutritive carbohydrate sweeteners which are the monomers, glucose and fructose, and/or polymers thereof. These include glucose syrups, sucrose and/or invert syrups and dextrose. The reactants may be the carbonates and hydroxides of sodium and potassium or hydrochloric, acetic, citric and sulfuric acids. Ammonia and sulfite compounds may not be used.

The identity test for Caramel Color (plain) that differentiates it from the other classes noted hereinabove is based on total nitrogen and total sulfur contents of the caramel, that is a total nitrogen content of <0.1 percent and a total sulfur content of 21 0.1 percent. The specifications of Class I Caramel Color (plain) are as follows:

| | TYPES OF CARAMEL COLOR (PLAIN) | |
|---|---|---|
| | CP-1 | CP-2 |
| PRODUCT | | |
| Color Intensity × 10³ | 5–35 | 40–80 |
| Solids, % Range | 55–75 | 55–75 |
| 4-Methylimidazole, Max. mg/kg | 25 | 25 |
| PROCESS | | |
| Temperature °C. Max. Permitted during process | 190 | 190 |
| Time, Max. Hrs. above 100° C. | 8 hrs. | 8 hrs. |
| Total Nitrogen, % Less than | 0.1 | 0.1 |
| Total Sulfur, % Less than | 0.1 | 0.1 |

| | TYPES OF CARAMEL COLOR (PLAIN) | |
|---|---|---|
| | CP-1 | CP-2 |
| Ammoniacal Nitrogen, Max. % | 0.01 | 0.01 |
| Sulfur Dioxide, Max. % | 0.005 | 0.005 |

Note 1 - Maximum temperature is defined as the maximum temperature obtained during processing.
Note 2 - Time maximum in hours is defined as the total time of heating above 100° C. including the time of any hold.

Class I, CP-1 is particularly preferred because it was found to impart a very realistic, light yellowish-brown color to the resulting products which closely resemble the color of natural cork.

The caramel colorant is added to the synthetic resinous material in an amount sufficient to impart to the resulting plastic closures a color which very closely resembles that of natural cork. Thus an amount of powdered caramel up to about 1% by weight, based on the total weight of the mixture to be molded, preferably about 0.25 to 1% by weight has been found to be effective in achieving the desired natural cork color, with about 0.25% by weight being particularly preferable. Since the color intensity of natural cork is known to vary widely, the amount of colorant can be correspondingly varied widely based upon the desired final color. Thus in experiments in which the colorant amounts were varied from about ¼ to 4 times the preferred amount of 0.25% by weight, no significant changes occurred in either the processing parameters or the products other than the expected changes in color intensity of the final products. If a liquid caramel colorant is used instead of a powdered colorant, the amounts referred to above will vary somewhat based on the amount of water present in the liquid colorant.

A suitable chemical blowing agent is added to the basic resin or mixture of resins to expand the resin to a desired density. The preferred blowing agent is azodicarbonamide (ABFA) because of its decomposition temperature which is in the normal processing range of the EVA resin and because of its relatively high rate of gas evolution. Of course, other known blowing agents, may be utilized without departing from the spirit and scope of the present invention.

The amount of blowing agent to be added is dependent upon the density distribution desired in the finished article and the processing temperature of the raw material. For example, it has been found that by minimizing the proportion of blowing agent level and/or the processing temperature, articles are produced that exhibit a less dense outer skin and a less porous inner core, thereby making the density distribution through the article more uniform, which of course, is more desirable in preventing leakage paths on the exterior surface of the molded articles. An amount of blowing agent up to about 1% by weight has been found to be desirable with an amount of 0.25 to 0.75% by weight being particularly effective. Optionally, a number of other materials also may be added including surface lubricants, chemical blowing agent activators and ultra-violet radiation stabilizers, all of which may add slight improvements to the producibility and/or performance of the articles. In this connection, the use of powdered caramel is particularly advantageous since it can be pre-blended with other powdered materials such as the blowing agents, the surface lubricants, the activators, the stabilizers and the like to insure uniform dispersion.

In producing synthetic cork closures, appropriate amounts of each of the materials are mixed thoroughly prior to molding. A typically preferred blend is as follows:

| EVA, containing 9–25% by weight VA and a melt index of about 2.0–8.0 | 80.25% |
|---|---|
| Polyethylene homopolymer | 19.00% |
| ABFA | 0.50% |
| Caramel powder colorant | 0.25% |

Figure 3:
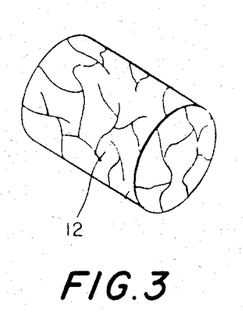
FIG. 3 is a perspective view of one embodiment of a closure for a liquid product container.
Figure 4:
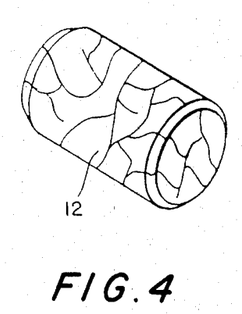
FIG. 4 is a perspective view of another embodiment of a closure for a liquid product container.
Figure 5:
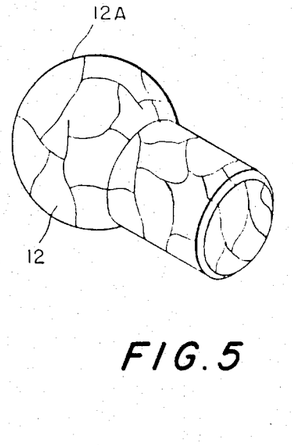
FIG. 5 is a perspective view of still another embodiment of a closure for a liquid product container.
Figure 6:
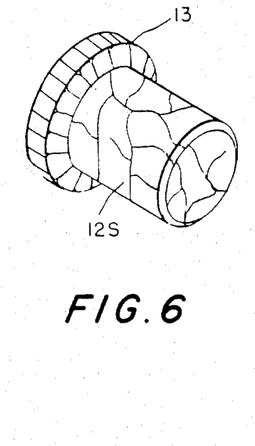
FIG. 6 is a perspective view of a closure for a liquid product container which incorporates the cork-like appearance in only a portion of the closure.
Figure 7:
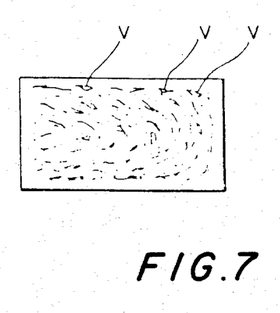
FIG. 7 is a cross-sectional view of a closure for a liquid product container formed from the mold of FIG. 1.

With this blend, 24 mm diameter by 1.75 inch long closures 12 of the type often utilized in standard 750 ml wine bottles, and as shown in FIGS. 3 and 4, were manufactured at processing temperatures in the range of 370°–400° F. and an injection pressure of 20,000 psig. This particular closure size and resultant density distribution showed superior mechanical performance characteristics similar to natural cork closures or to other synthetic cork closures of a different density distribution. Other closure styles have been manufactured using this blend of materials and have shown comparable results. These include a closure 12 having an enlarged end 12A for gripping, as shown in FIG. 5, and the shank portion 12S of a 2-piece closure as shown in FIG. 6, which is substantially attached or glued to a metal, plastic or wooden cap 13 with an adhesive.

To minimize the cooling time of the molded article, the optimum mold temperature was found to be about 70°–90° F. After molding, the closures are ejected from each mold cavity into water or a refrigerated environment for cooling purposes.

To produce articles which would perform adequately as closures and which incorporate the decorative surface resembling natural cork, it is necessary to design a special mold which causes the melted resinous material to be injected into each mold cavity in the form of a single long continuous strand. This is done by fitting each mold of a plurality of mold cavities with a single aperture or gate of extremely small size through which all resin entering the cavity must pass. The surface decoration was found to be alterable by changing the size of the orifice. However, articles molded using an orifice diameter between 0.030 and 0.055 inch were most preferred from an aesthetic standpoint. Pressure on the melted resinous material from the injection unit forces the melted resinous material to be injected into each cavity through its respective orifice at an injection pressure of about 14,000 to 20,000 psig, thereby depositing a single strand of softened resin into the mold cavity at an injection speed sufficient to inject about 5 grams of raw material per second into the mold cavity. The cavity walls of each enclosure, in turn, produce resistance to the strand and force the strand to collect in a randomly oriented group of coils which expand to fill the cavity. The coalesence of the loops during expansion creates randomly oriented grain lines which remain clearly visible in the article's surface following solidification. The presence of the randomly oriented grain lines, results in a molded article that closely resembles natural cork. The caramel colorant can be added to the thermoplastic material at any time prior to its introduction into the mold cavity.

Figure 1:
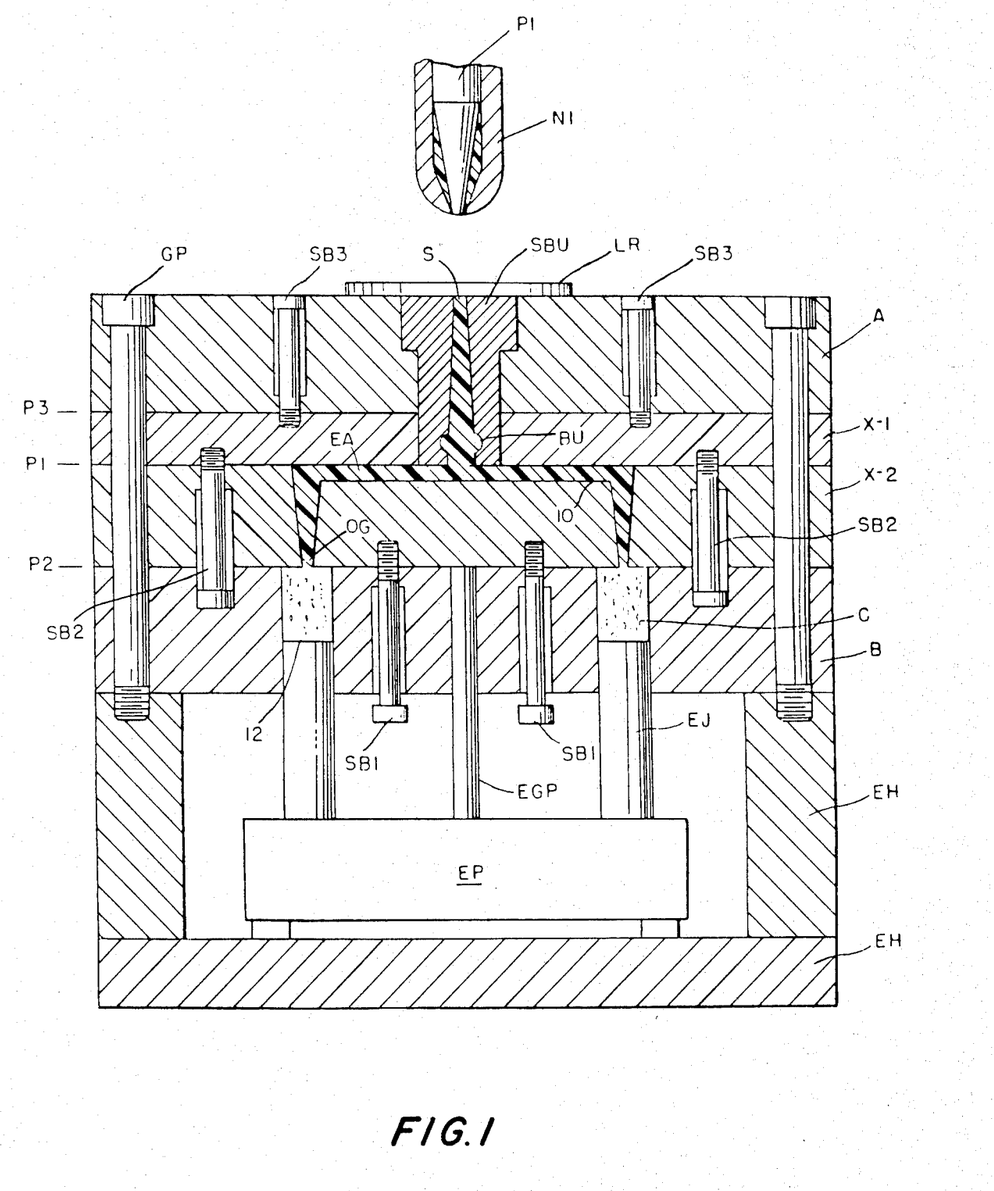
FIG. 1 is a cross-sectional view of a typical mold which could be used in an attempt to manufacture closures for liquid product containers which resemble natural cork.

One type of mold which can be utilized is depicted in FIG. 1. Because the molded article's ability to seal the contain heaters (not shown) which prevent the plastic resin in the runner system EA from solidifying. A lone parting line P1 exists between plats A and B since the X-1 and X-2 plates no longer exist.

To accomplish this task of eliminating void spaces, it is desirable to increase the injection pressure to the maximum available on the particular molding machine (at the time of the test, approximately 16,000 psig), and because injection pressure is created in this case by a hydraulic fluid cylinder, to enlarge the flow channel of pressurized hydraulic fluid to the cylinder so that a very high pressure can be maintained on the resin at all times during injection. Next, mold cavity venting should be decreased to a minimum by reducing the clearances between the mold parts such as plates A and B which form the cavities C. This results in the cavities being temporarily pressurized by the entrance of the resin and subsequent displacement of the air so that the pressure, which served to restrict the expansion of the resin, is retained longer.

Figure 9:
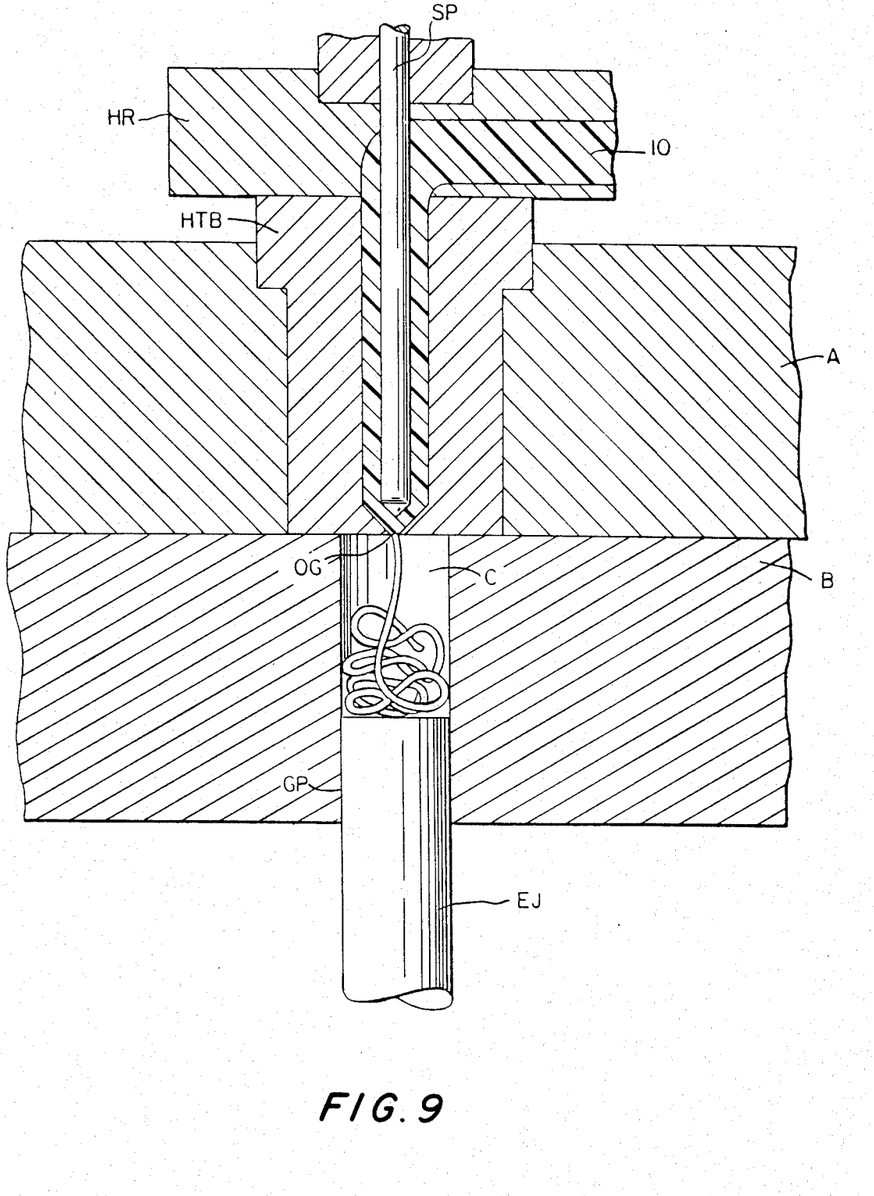
FIG. 9 is an enlargement of a portion of FIG. 2 showing a shutoff pin SP in a retracted position and a single strand of unexpanded resinous material being introduced into the mold cavity.

However, when a mold is utilized such as the mold of FIG. 1, even with extremely rapid injection times and minimum venting, some shear boundary layer damage may still occur to the interior of the molded articles 12 due to the continued slow ingress of pressurized material from the sprue chamber to the cavity C long after actual injection has ceased. That it was found that to control the transfer of material more directly, it was necessary to incorporate a valve within the orifice gate OG itself. This led to the preferred mold and valve configuration depicted in FIG. 2. FIG. 9, which is an enlargement of a portion of FIG. 2, shows a shutoff pin SP in the retracted position and a single strand of unexpanded resinous material being introduced into the mold cavity.

Figure 2:
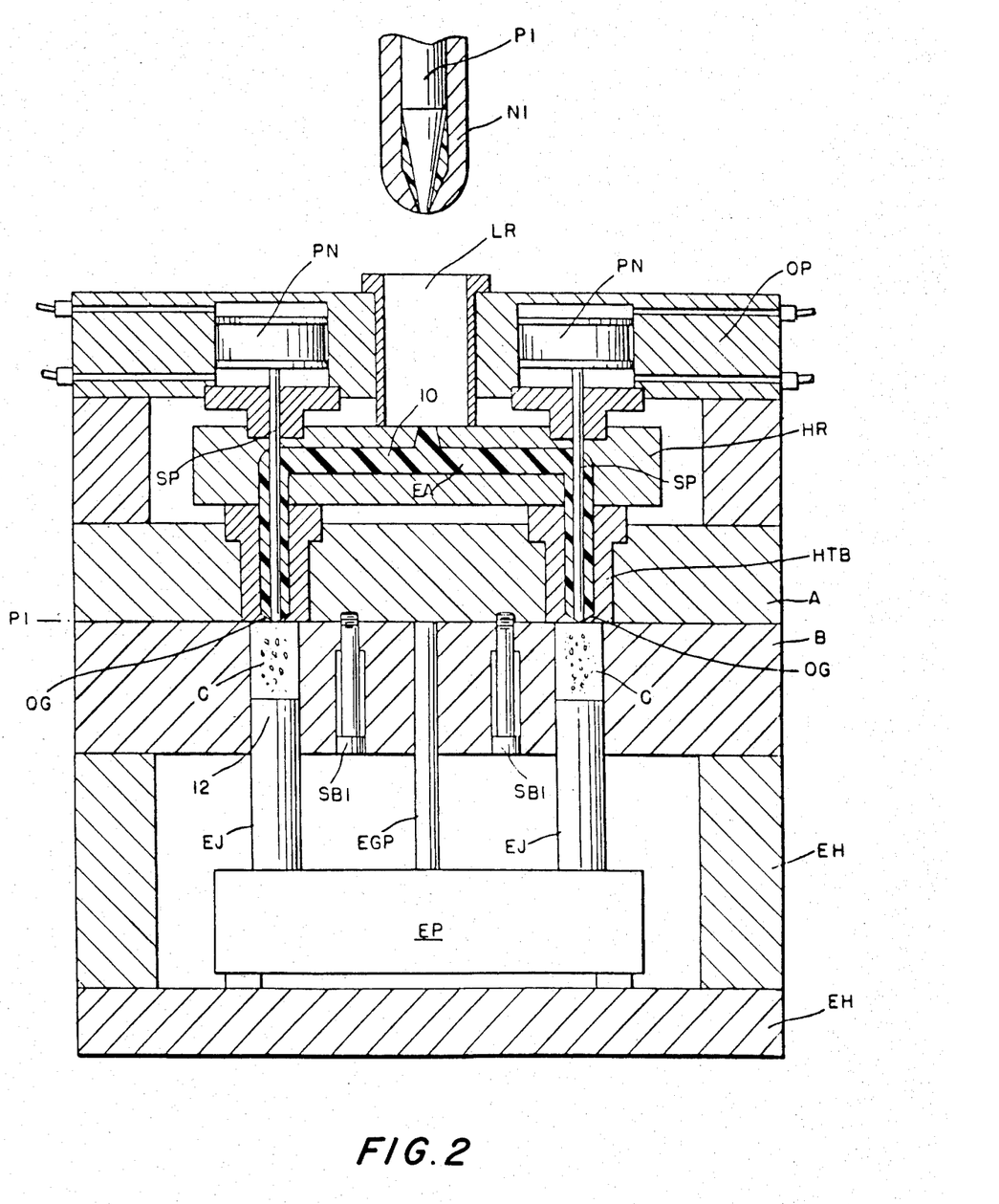
FIG. 2 is a cross-sectional view of a mold for the manufacture of closures for liquid product containers which resemble natural cork, wherein the molded closures do not possess undesirable channels on the exterior surface thereof and are not subject to appreciable wrinkling.

The valve pins SP of FIG. 2 are specially designed to fit into orifice gates OG of the mold and to perform the intended function of allowing sprueless molding.

The pins SP slide back and forth in the runner system EA, opening and closing the orifice gates. The pins SP can be powered hydraulically or pneumatically, using a piston arrangement PN as shown in FIG. 2. Of additional importance is the fact that the sealing is accomplished at the very tip of the orifice gate OG to prevent any premature expansion of resin.

With this FIG. 2 mold, a cycle is also initiated as in FIG. 1 by bringing the nozzle into contact with the hot runner manifold HR, opening the valves P1 and SP and injecting a measured amount of resin into each cavity. Again, before each cavity is completely filled, the valves are shutoff, allowing the material already in each cavity C to expand. However, because the shutoff pins in FIG. 2 are directly adjacent to the mold cavities at openings OG, no volume of softened, pressurized material remains in direct contact with the material being molded during the cooling and solidification period of the molded articles 12 which could cause the continued slow ingress of material into the cavities C. By the continued utilization of high injection pressure and minimum mold venting, it is possible, in this FIG. 2 design to complete and terminate the injection of material into each mold cavity proper prior to its expansion to form a skin. Thus, the creation of the undesirable void spaces is eliminated.

Figure 8:
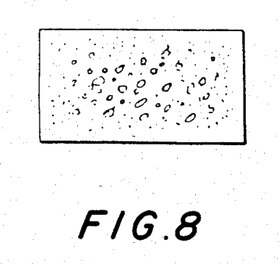
FIG. 8 is a cross-sectional view of a closure for a liquid product container of the improved type made in accordance with the mold of FIG. 2.

The remainder of the molding cycle is similar to other conventional injection molding operations, as described in the operation of the mold of FIG. 1. After a sufficient cooling period, the mold is opened and the solidified closure 12 is automatically ejected into water or similar refrigerated environment. Reclosing the mold initiates a repeat of the cycle. Closures molded by this method of FIG. 2, as shown in FIG. 8, have been found to exhibit none of the boundary layer-created voids of previous methods. Subsequent usage in liquid product containers has shown that leakage due to channels in the closure surface has ceased to be a problem. Furthermore, in the present molding method, no material is wasted by solidification in the sprue and runner chamber, thereby reducing molding costs.

It can be readily recognized that many of the parameters utilized in conducting the molding operation are mutually interdependent upon one another. For example, the injection pressure is a function of the injection speed and thus these parameters are dependent upon each other. Also the pressure within the mold is continually changing depending upon the injection pressure and/or injection speed, the size of the mold, the extent of the venting of the mold, and the like. Because of the many process variables which are mutually interdependent and continually changing it is difficult to generalize as to specific process parameters of the molding operation. However, knowing the desired properties of the plastic closure and a method which can be followed to achieve these results one can readily determine specific parameters for a given molding device possessing specific mold sizes and injection orifice sizes, such as mold temperatures, injection speeds and the like.

The invention being thus described, it will be obvious that the same may be varied in many ways. Such variations are not to be regarded as a departure from the spirit and scope of the present invention and all such modifications as would be obvious to one skilled in the art are intended to be included within the scope of the following claims.

What is claimed is:

1. A molded closure possessing good flexibility and resiliency and having the appearance of natural cork which comprises
    an expanded thermoplastic resinous material having the shape of the desired closure, and caramel as colorant therefor,
    said expanded thermoplastic resinous closure containing a dense liquid-impervious outer skin and a porous inner core and being substantially free of large void spaces between said outer skin and inner core, whereby resistance to wrinkling during compression of the closure is effectively eliminated, and
    said caramel colorant is present in an amount sufficient to give the closure the appearance of natural cork.

2. The molded closure of claim 1 wherein the colorant is powdered caramel.

3. The molded closure of claim 1 wherein the thermoplastic resinous material is an ethylene-vinyl acetate copolymer.

* * * * *